United States Patent
Tang et al.

(10) Patent No.: US 12,264,852 B2
(45) Date of Patent: Apr. 1, 2025

(54) COMPRESSOR AND SEAL

(71) Applicant: Honeywell International Inc., Charlotte, NC (US)

(72) Inventors: Benjamin Tang, Monterey Park, CA (US); Amanda L. Webb, Torrance, CA (US)

(73) Assignee: Honeywell International Inc., Charlotte, NC (US)

( * ) Notice: Subject to any disclaimer, the term of this patent is extended or adjusted under 35 U.S.C. 154(b) by 87 days.

(21) Appl. No.: 18/186,704

(22) Filed: Mar. 20, 2023

(65) Prior Publication Data

US 2024/0318873 A1    Sep. 26, 2024

(51) Int. Cl.
| | |
|---|---|
| *F25B 1/053* | (2006.01) |
| *F04D 17/10* | (2006.01) |
| *F04D 29/08* | (2006.01) |

(52) U.S. Cl.
CPC .............. *F25B 1/053* (2013.01); *F04D 17/10* (2013.01); *F04D 29/08* (2013.01)

(58) Field of Classification Search
CPC ........ F25B 1/053; F04D 17/10; F04D 17/122; F04D 29/08; F04D 29/063; F04D 29/10; F04D 25/06; F16J 15/447
See application file for complete search history.

(56) References Cited

U.S. PATENT DOCUMENTS

| | | | |
|---|---|---|---|
| 3,927,890 A | 12/1975 | Adams, Jr. | |
| 5,224,713 A | 7/1993 | Pope | |
| 11,209,009 B2 * | 12/2021 | Masuda | .............. F04D 29/0516 |
| 2020/0200273 A1 | 6/2020 | Bergmann et al. | |

FOREIGN PATENT DOCUMENTS

| | | | | |
|---|---|---|---|---|
| CN | 101287911 A | * | 10/2008 | ........... F04D 29/083 |
| CN | 104879324 A | * | 9/2015 | |
| CN | 105041479 A | | 11/2015 | |
| CN | 109996966 A | * | 7/2019 | ............. F04D 17/12 |
| CN | 110792615 A | * | 2/2020 | ........... F04D 29/441 |
| CN | 111637088 A | | 9/2020 | |
| CN | 114893555 A | | 8/2022 | |
| JP | S62110081 A | | 5/1987 | |
| JP | 4839979 B2 | * | 12/2011 | ........... F04D 17/122 |
| JP | 5540032 B2 | | 7/2014 | |
| JP | 2020133600 A | * | 8/2020 | ............. F16J 15/447 |
| WO | 2021120772 A1 | | 6/2021 | |

OTHER PUBLICATIONS

Extended Search Report from counterpart European Application No. 24161099.7 dated Aug. 16, 2024, 9 pp.

Response to Extended Search Report dated Aug. 16, 2024, from counterpart European Application No. 24161099.7 filed Nov. 7, 2024, 30 pp.

* cited by examiner

Primary Examiner — Emmanuel E Duke

(74) Attorney, Agent, or Firm — Shumaker & Sieffert, P.A.

(57) ABSTRACT

An example centrifugal compressor includes a first stage and a second stage, a flow path within the centrifugal compressor between the first and second stages, an impeller, and a labyrinth seal. The labyrinth seal comprises a plurality of teeth, a lumen through a thickness of the labyrinth seal, and a lumen inlet disposed between adjacent teeth of the plurality of teeth.

20 Claims, 3 Drawing Sheets

COMPRESSOR AND SEAL

TECHNICAL FIELD

The present disclosure relates to systems and techniques for producing conditioned air for a vehicle cabin (e.g., an aircraft cabin, an automobile cabin, a spacecraft cabin, a watercraft, etc.), and more particularly, to compressor systems.

BACKGROUND

A vapor cooling system may cool a fresh air stream using a refrigerant. The vapor cooling system compresses and condenses the refrigerant from a relatively low-pressure vapor to a relatively high-pressure liquid, which then expands and evaporates to remove heat from the fresh air stream.

SUMMARY

In one example, this disclosure describes a centrifugal compressor including: a first stage and a second stage; a flow path within the centrifugal compressor between the first and second stages; an impeller; and a seal including: a labyrinth seal comprising a plurality of teeth; and a lumen through a thickness of the labyrinth seal having a lumen inlet disposed between adjacent teeth of the plurality of teeth.

In another example, this disclosure describes a vapor-cooling system including: a condenser; an evaporator; and a centrifugal compressor includes an impeller; and a seal including: a labyrinth seal comprising a plurality of teeth; and a lumen through a thickness of the labyrinth seal having a lumen inlet disposed between adjacent teeth of the plurality of teeth.

In another example, this disclosure describes a centrifugal compressor including: an impeller; and a seal including: a labyrinth seal comprising a plurality of teeth; and a lumen through a thickness of the labyrinth seal having a lumen inlet disposed between adjacent teeth of the plurality of teeth.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

Like reference characters refer to like elements throughout the figures and description.

DETAILED DESCRIPTION

Figure 1:
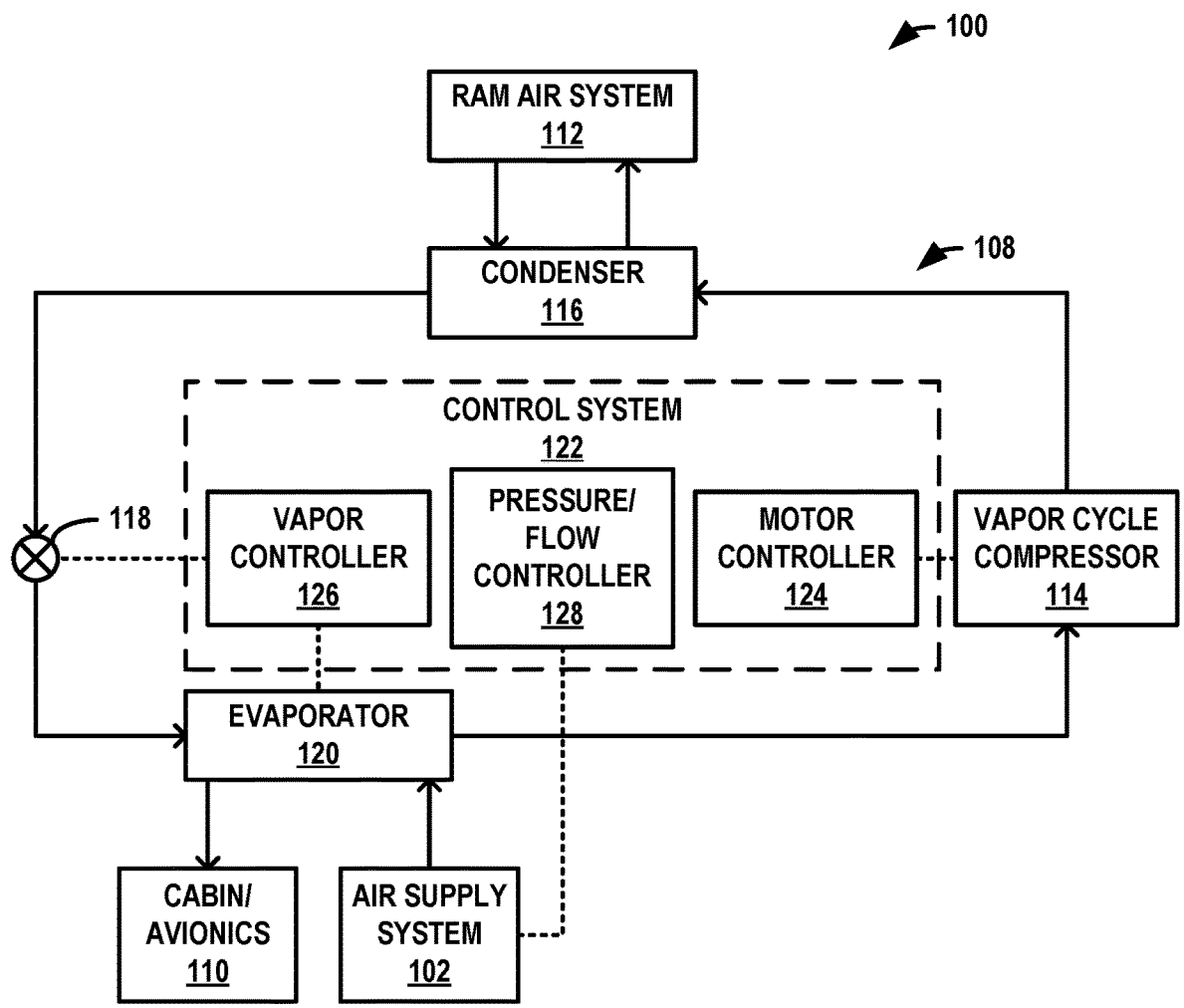
FIG. 1 is a block diagram illustrating a system for generating conditioned air that includes an example vapor cooling system (VCS).

Various examples discussed herein describe vapor cooling systems, vapor compression systems, centrifugal compressors, and centrifugal compressor components that may have reduced size, weight, cost, and power consumption.

A centrifugal compressor is configured to drive one or more impellers using a compressor motor to compress a vapor refrigerant to a higher pressure. Components of the compressor, such as a motor stator, bearings, and/or a motor controller coupled to a housing of the compressor, may generate heat that requires cooling. The compressor may receive the vapor refrigerant, compress the vapor refrigerant in one or more compression stages, and cause at least a portion flow the vapor refrigerant from one or more of the compression stages to flow across components of the compressor motor to cool the components, e.g., to cool bearings within the compressor.

To control the flow of the vapor refrigerant though the compressor, interstage seals between moving components (e.g., impeller) and non-moving components (e.g., a compressor housing, separation plate, or the like) may be used to limit, reduce, and/or eliminate the flow of the vapor refrigerant between the moving and non-moving components, e.g., to limit, reduce, and/or eliminate backflow within gaps between the moving and non-moving components from a later compression stage having a high pressure to a previous compression stage having a lower pressure. Conventionally, cooling intake holes are utilized to receive a portion of the flow of vapor refrigerant having a higher pressure at a later compression stage to guide the vapor refrigerant to components to be cooled within volumes at a comparatively less pressure. The cooling intake holes comprise a lumen fluidically connecting a volume at the relatively higher compression stage to a volume including components to be cooled and an inlet to the lumen positioned within the volume of the higher compression stage. Interstage seals are conventionally positioned between the inlet of the intake holes, being located within a volume of a relatively higher compression stage, and the relatively lower pressure previous stage.

Conventionally, the seals used may be relatively expensive segmented carbon ring seals or relatively less expensive contacting type labyrinth seals. In some compressors the available space may not be sufficient for segmented carbon ring seals or contacting type labyrinth seals. Additionally, contacting type labyrinth seals may cause debris that reduces the service life of the compressor and/or components of the compressor, e.g., in closed-circuit vapor cycle systems. Non-contacting labyrinth seals may reduce a gap between moving and non-moving parts, but still leave a gap in order to be non-contact, and allow at least some leak, e.g., interstage backflow. For vapor cycle compressors having a high density and low volume working fluid, reducing and/or eliminating leak/backflow is important in order to achieve a high overall compressor efficiency.

In accordance with the systems and techniques disclosed herein, a compressor includes non-contacting type labyrinth seals and cooling intake holes comprising an inlet positioned within a non-contacting type labyrinth seal lane. The positioning of the cooling intake hole is configured to reduce and/or eliminate a pressure differential across the final tooth, or teeth, of the labyrinth seal that are proximate the lower pressure compression stage. In some examples, the inclusion of the non-contacting type labyrinth seal and cooling intake hole positioned within the seal lane may eliminate the need for at least one segmented carbon seal and Babbitt material, e.g., of a contacting-type labyrinth seal, as well as reducing and/or eliminating debris and/or contamination via eliminating the use of a contacting-type labyrinth seal.

FIG. 1 is a block diagram illustrating an example system 100 for generating conditioned air that includes a vapor cooling system (VCS) 108. The conditioned air may be used to cool volumes or components of various cabins or avionics systems 110. Cabin/avionics 110 may be a compartment of a vehicle (e.g., an aircraft, an automobile, a spacecraft, a watercraft, etc.) that includes an internal environment and/or one or more avionics systems that receive cooled air for cooling equipment. For example, cabin/avionics 110 may be configured to house people, cargo, and the like, in the internal environment. It will be understood that avionics generally relate to aircraft, spacecraft, etc., and that other systems may include other electronic systems/control systems configured for cooling. Thus, while described as cabin/avionics 110, the techniques of this disclosure are not so limited, and a person skilled in the art will understand that the systems described herein may be employed in a variety of contexts without significantly departing from structures and mechanics described herein.

VCS 108 includes a vapor cycle compressor (VCC) 114, a condenser 116, an expansion device 118 (e.g., an expansion valve), and an evaporator 120 fluidically coupled to each other through pressurized refrigerant supply lines to form a refrigerant circuit. A variety of refrigerants may be used in VCS 108.

VCC 114 may be configured to receive vapor refrigerant from evaporator 120 and compress and pump vapor refrigerant to condenser 116. VCC 114 may include a centrifugal compressor configured to receive the vapor refrigerant at an inlet pressure and discharge the vapor refrigerant at a higher outlet pressure. VCC 114 may include one or more compression stages and an electrically driven motor. The motor may be configured to receive electrical power, such as from a motor controller 124, and generate mechanical power to drive the one or more compression stages. Condenser 116 may be configured to receive saturated vapor refrigerant from VCC 114, condense the vapor refrigerant, and discharge saturated refrigerant to an expansion device 118. Condenser 116 may be cooled by environmental air, such as ram air flow, from a ram air system 112, or another fluid such as fuel or heat transport fluids.

Expansion device 118 may be configured to control flow of refrigerant to evaporator 120 and reduce a pressure of saturated refrigerant prior to entry into evaporator 120. Expansion device 118 may be an orifice, tube, metered valve, or other device configured to reduce a pressure of a saturated refrigerant. Evaporator 120 may be configured to receive cabin pressure air, such as from an air supply system 102, remove heat from cabin air using a refrigerant, and discharge cabin air to cabin/avionics 110. On a refrigerant side, evaporator 120 may be configured to receive saturated refrigerant, absorb heat from the cabin air, vaporize the refrigerant, and discharge superheated vapor refrigerant.

System 100 includes a control system 122 for controlling various conditions of VCS 108, such as refrigerant flow rate, refrigerant vapor composition, refrigerant temperature, and the like. Control system 122 may be configured to monitor and/or operate one or more process control components of system 100. For example, control system 122 may be communicatively coupled to any of air supply system 102, ram air system 112, VCC 114, expansion device 118, or any other component of system 100. Control system 122 may also be communicatively coupled to instrumentation, such as flow meters, temperature sensors, and pressure sensors, and configured to receive measurement signals from the instrumentation. For example, control system 122 may be configured to receive measurement signals for various parameters of VCS 108, such as a speed of VCC 114, temperature of cabin air leaving evaporator 120, or a superheat of vapor refrigerant entering VCC 114, determine a mismatch between the measurement signals and a setpoint for the corresponding parameter, and send a control signal to one or more components of system 100 to reduce the mismatch and return the parameter to within the setpoint. Control system 122 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, and the like.

Control system 122 may include a motor controller 124 configured to control a motor of VCC 114. As discussed above, a motor may provide mechanical power to one or more impellers of VCC 114, and therefore modulate flow rate of refrigerant through VCS 108. The speed of VCC 114 may correspond to various temperature setpoints of VCS 108, such as cooling demands of evaporator 120 and inlet superheat of the vapor refrigerant into VCC 114. To control a speed of VCC 114, motor controller 124 may be configured to send control signals to VCC 114 to control an amount of electrical power to the motor of VCC 114, such as from an APU or other power supply. Control system 122 may include a vapor controller 126 configured to control a vapor composition of the refrigerant in VCS 108. To control a vapor composition of the refrigerant, vapor controller 126 may be configured to send control signals to expansion device 118 and/or evaporator 120 to control a position of expansion device 118 and/or a position of a bypass valve of evaporator 120, such as by closing expansion device 118 to increase a superheat of the refrigerant entering VCC 114. Control system 122 may include a pressure/flow controller 128 configured to control pressure and/or flow of supply air to evaporator 120. In some examples, pressure/flow controller 128 may be configured to control air supply system 102 to generate a particular flow of supply air from air supply system 102. For example, pressure/flow controller 128 may be configured to send control signals to air supply system 102 to control a pressure of supply air, such as by controlling an amount of bleed air or a speed of a load compressor (via an APU) or cabin air compressor. In some examples, pressure/flow controller 128 may be configured to control ram air system 112 in order to receive a particular flow of supply air from ram air system 112.

Vapor cooling system (e.g., vapor compression systems) discussed herein may include a multi-stage centrifugal compressor to compress a vapor refrigerant and cool various components of the compressor using the vapor refrigerant as a cooling medium. For example, vapor cycle compressor 114 may be a multi-stage compressor comprising at least a first stage and a second stage and a flow path between the multiple stages, e.g., a fluid flow path for vapor refrigerate. Vapor cycle compressor 114 may also include one or more non-contacting type labyrinth seals comprising a plurality of teeth and configured to reduce and/or eliminate fluid from flowing from a higher, later compression stage to a lower, earlier compression stage. Vapor cycle compressor 114 may also comprise a cooling intake hole (or a plurality of such holes) configured to provide a fluid path from the higher, later compression stage to components of vapor cycle compressor 114 to cool such components, e.g., rotor bearings. In some examples, the cooling intake holes may allow the fluid (e.g., vapor refrigerant) to expand and cool to provide cooling to components of vapor cycle compressor 114. Vapor cycle compressor 114 may also include a lumen through the thickness of the one or more labyrinth seals having an inlet disposed between adjacent teeth of the plurality of teeth of the seals, and in fluid communication with the cooling intake hole(s), e.g., the lumen or lumens may be positioned within a lane or lanes of the non-contacting type labyrinth seal(s). The positioning of the lumen, e.g., the cooling intake hole inlet, is configured to reduce and/or eliminate a pressure differential across the final tooth, or teeth, of the labyrinth seal that are proximate the lower, earlier pressure compression stage. In some examples, the inclusion of a non-contacting type labyrinth seal and a cooling intake hole positioned within the seal lane may eliminate the need for at least one segmented carbon seal and Babbitt material, e.g., of a contacting-type labyrinth seal, as well as reducing and/or eliminating debris and/or contamination via eliminating the use of a contacting-type labyrinth seal.

Figure 2:
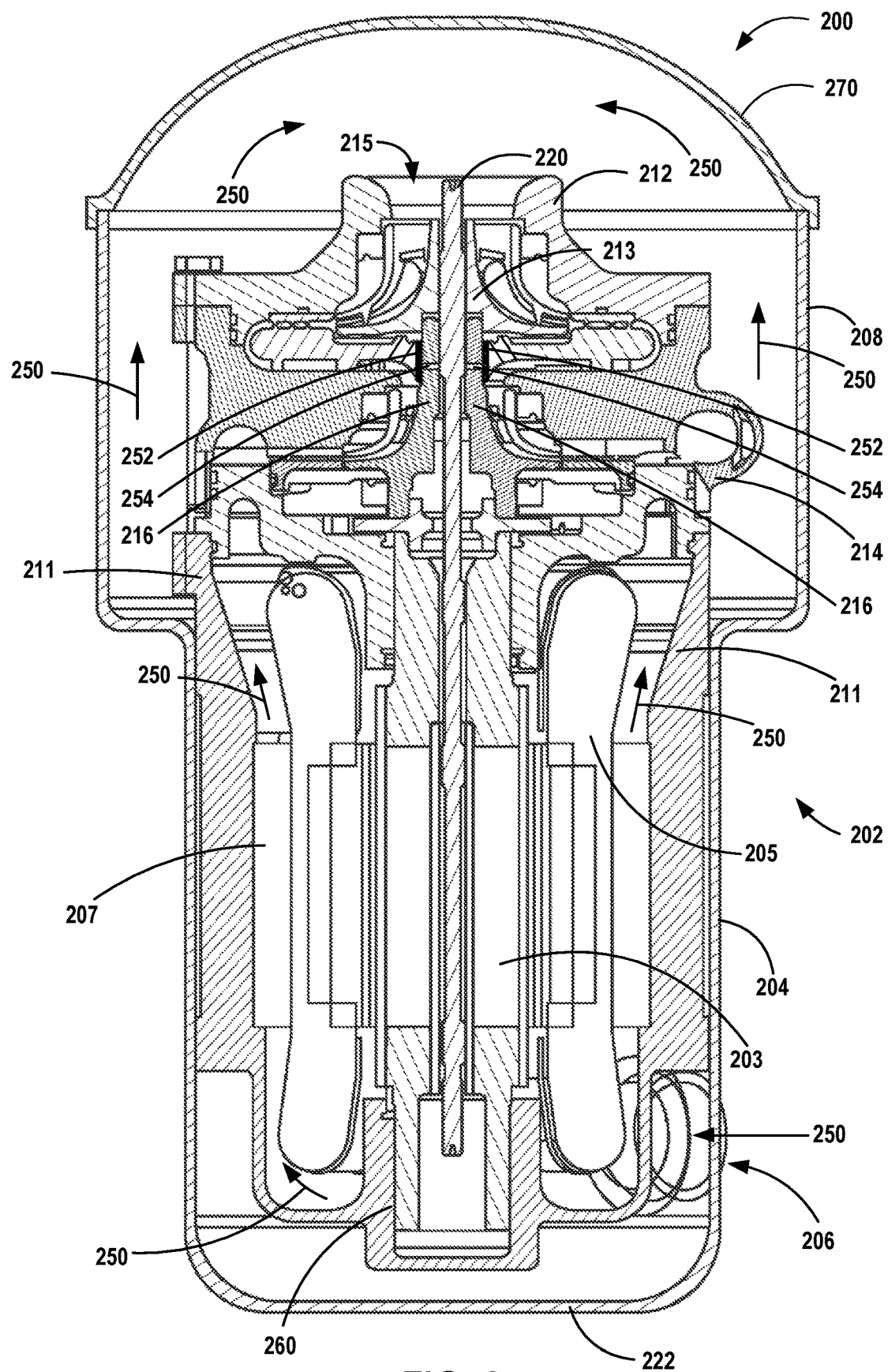
FIG. 2 is a cross-sectional side view diagram illustrating an example centrifugal compressor, in accordance with one or more techniques of this disclosure.

Centrifugal compressors described herein may include one or more flow paths through which vapor refrigerant may flow to remove heat from various components of the centrifugal compressors. FIG. 2 is a cross-sectional view of an example centrifugal compressor 200, in accordance with one or more techniques of this disclosure. Centrifugal compressor 200 includes a compressor motor 207, an impeller assembly that includes at least one impeller, e.g., impellers 213 and 216 in the example shown, and a shaft 220 mechanically coupling compressor motor rotor 203 to impellers 213, 216. In some examples, shaft 220 may be a tie bolt.

Centrifugal compressors described herein may be configured to form a relatively tight containment to hermetically seal the vapor refrigerant within the vapor compression system. Centrifugal compressor 200 may be used as VCC 114 in the example system 100 of FIG. 1. Centrifugal compressor 200 includes a compressor housing 202 and an end housing 270. Compressor housing 202 may be configured to house centrifugal compressor 200 flow vapor refrigerant therethrough.

Compressor housing 202 may be a main compressor housing that substantially defines a volume within centrifugal compressor 200. Compressor housing 202 may mate with end housing 270 to form an enclosure for the components of centrifugal compressor 200. Centrifugal compressor 200 may include one or more mechanisms to secure compressor housing 202 and end housing 270. In some examples, a set of bolt holes may be included on each mating surface of end housing 270 and compressor housing 202. In such examples, end housing 270 and compressor housing 202 may be sealed using a set of bolts (not shown). In some examples, end housing 270 and compressor housing 202 may be sealed by other means, such as welding, adhesives, etc.

Compressor housing 202 and end housing 270 may be configured to hermetically seal the vapor refrigerant from an environment outside of compressor 200. For example, centrifugal compressor 200 may be hermetically sealed by substantially containing the vapor refrigerant within compressor housing 202 and substantially preventing outside air from breaching compressor housing 202 at normal operating pressures of the vapor refrigerant. In some instances, end housing 270 may be integral with main housing 202, so as to form a single hermetically sealed compressor 200 (e.g., using additive manufacturing to form the housing to enclose components of compressor 200). As a result, a hermetic seal may be formed between the end housing 270 and the second portion 208 that is sufficient to prevent a flow of low-pressure vapor refrigerant through the hermetic seal or any other portion of compressor 200. In some examples, compressor 200 may use bolts (not shown) to seal end housing 270 to second portion 208. In other examples, compressor 200 may have a sealing mechanism for end housing 270 that does not use bolts to seal the end housing 270 to second portion 208. For example, end housing 270 may be welded to second portion 208.

Compressor housing 202 may include two or more portions configured to house various components of compressor 200. In the example shown, compressor housing 202 includes a first portion 204 and a second portion 208. Compressor housing 202 may include various ports to receive and discharge vapor refrigerant and deliver electrical power to various electrical components. Compressor housing 202 includes an inlet port 206 configured to receive vapor (and, potentially, a portion of liquid) refrigerant, such as from evaporator 120 illustrated in FIG. 1. As shown, inlet port 206 is included with first portion 204. Compressor housing 202 may include an outlet port (e.g., a compressed vapor outlet port, not visible in the example shown) configured to discharge vapor refrigerant, such as to condenser 116 illustrated in FIG. 1.

In some examples, first portion 204 of compressor housing 202 may have a first substantially cylindrical shape and second portion 208 of compressor housing 202 may have a second substantially cylindrical shape. In some examples, the first substantially cylindrical shape may have a first outer diameter and the second substantially cylindrical shape may have a second outer diameter that is greater than the first outer diameter, such that the second substantially cylindrical shape is wider than the first substantially cylindrical shape.

Compressor motor 207 is configured to drive rotor 203 to rotate impellers 213, 216. Centrifugal motor may include windings 205 coupled to compressor housing 202 and a rotor 203 coupled to shaft 220. Windings 205 may be configured to receive electrical signal from a motor controller and generate a dynamic magnetic field to drive rotor 203. In some examples, compressor motor 207 may be configured to rotate impellers 213, 216 at approximately 80,000 rotations per minute (RPMs) or at a higher rotations per minute. For example, compressor motor 207 may be configured to spin impellers 213, 216 at approximately 120,000 RPMs.

The impeller assembly may be configured to provide one or more stages of compression for compressor 200. In the example shown, compressor 200 is illustrated as a two-stage compressor in which the impeller assembly includes a first stage impeller and a second stage impeller that is downstream of the first stage impeller. In such examples, one or both impellers may be a shroudless impeller wheel. For example, the first stage impeller 213 may be a shroudless impeller wheel. In some examples, the impeller assembly includes a shroud that interfaces with an inlet housing 212. In such examples, the shroud is interposed between inlet housing 212 and impellers 213, 216. In some examples, a clearance is formed between impellers 213, 216 and inlet housing 212 to allow for impellers 213, 216 to not have a shroud (e.g., a shroudless impeller wheel). Although shown as having a two-stage compressor, the techniques of this disclosure are not so limited, and the compressor may comprise a more or less compressor stages in some instances. For example, the compressor may include only one impeller 213, or could have three or more impellers.

In some examples, compressor housing 202 and various components of compressor 200 may define a flow path 250 through compressor 200 for vapor refrigerant from an inlet port 206 to an outlet port (not shown). Vapor refrigerant may enter compressor 200 through inlet port 206 into first portion 204. The vapor refrigerant may flow through separation plate 211 into second portion 208 and into an opening 215 of inlet housing 212. The vapor refrigerant may then be compressed, via impellers 213, 216, and discharged from centrifugal compressor 200 via an outlet port (not shown). In some examples, the vapor refrigerant includes a low-pressure refrigerant (e.g., a refrigerant having a relatively low saturation vapor pressure). For example, the refrigerant gas may be R-1233zd, r236fa, or r245fa, or a similar low-pressure refrigerant.

In some examples, a portion of the vapor refrigerant, after entering inlet housing 212, may be routed elsewhere to cool other components of compressor 200. For example, various components of centrifugal compressor 200 that support shaft 220, such as the bearings, may experience friction that produces heat. To cool these various components, the portion of vapor refrigerant may flow down shaft 220 and through compressor motor 207 to a bearing holder 260 at an aft surface 222 of first portion 204 opposite end housing 270. This portion of the vapor refrigerant may remove heat from the various components and discharge back into a volume of compressor housing 202. Bearing holder 260 may sit in a cavity at the aft side. As shown, the aft side has an outer aft surface 222.

In some examples, compressor housing 202 may include an electrical port (not shown). In some examples, the electrical port may include an electrical port attachment (not shown) configured to attach, or be otherwise secured, to the electrical port so as to form an electrical connection port. In some examples, the electrical port attachment may attach to the electrical port via a plurality of bolts. In some examples, the electrical port or the electrical port attachment of the electrical connection port may be configured to form an electrical connection with an electrical connector (not shown). The electrical connector (not shown) may provide electrical power to a compressor motor 207 and pass electrical signals from any sensors internal to the compressor. That is, the electrical port may be configured to receive electrical power that may be used to operate compressor motor 207. In some examples, the electrical connection port is configured to be hermetically sealed.

Centrifugal compressor 200 may include one or more sensors configured to detect various properties of the vapor refrigerant. Some sensors may be internal to the compressor. For example, a sensor may be embedded in the windings 205 to detect motor temperature for purposes of protecting against motor overheat. Compressor housing 202 may be configured to position the various sensors within a volume of compressor housing 202. In some examples, end housing 270 may include one or more sensor ports (not shown) that may be configured to house one or more temperature or pressure sensing devices. The sensor cavity may be configured to allow for the one or more temperature and/or pressure sensing devices to measure the temperature or pressure of the vapor refrigerant as the vapor refrigerant flows along flow path 250. The sensed temperature and pressure may allow the degree of superheat to be detected and controlled, for example by modulating expansion device 118.

In some examples, compressor 200 may include one or more internal housings configured to position and/or secure components of compressor 200, such as compressor motor 207, shaft 220, and/or impellers 213, 216, to compressor housing 202 and/or direct flow of vapor refrigerant through compressor housing 202. As illustrated in FIG. 2, compressor 200 may include separation plate 211, inlet housing 212, and a scroll housing 214.

Inlet housing 212 may be configured to receive vapor refrigerant and direct the vapor refrigerant into the impeller assembly. For example, vapor refrigerant in second portion 208 may flow across a surface of inlet housing 212 into opening 215 to contact one or more of impellers 213, 216 of the impeller assembly. In some examples, inlet housing 212 may secure to second portion 208 of compressor housing 202, such that inlet housing 212 may be positioned within compressor housing 202. For example, a bolt (not shown) may insert through inlet housing 212 and secure into a hole of the second portion 208 of compressor housing 202. In some examples, a set of bolts may enter through inlet housing 212 and penetrate through separation plate 211.

Centrifugal compressor 200 may include a separation plate 211 that separates the compressor motor 207 from the impeller assembly. Separation plate 211 may be configured to separate compressed vapor refrigerant downstream of the impeller assembly from first portion 204. In some examples, separation plate 211 and inlet housing 212 may be configured to be connected via at least one bolt that extends into the at least one threaded hole. In some examples, separation plate 211 may include a bearing holder configured to house a bearing, and separation plate 211 may be configured to house the impeller assembly, such that impeller 213 and/or 216 is configured to rotate atop the separation.

In some examples, centrifugal compressor 200 includes a scroll housing 214 interposed between separation plate 211 and inlet housing 212. Scroll housing 214 may be configured to separate impeller 213 and/or 216 from an adjacent impeller and/or form a lateral boundary of the impeller assembly. In the example of FIG. 2, centrifugal compressor 200 may be a two-stage compressor that includes two impellers, such that scroll housing 214 may separate the two impellers. Although shown as a two-stage compressor, it will be understood that the techniques of this disclosure are not so limited, and that compressor 200 may include more or fewer stages (e.g., a single-stage compressor) with or without scroll housing 214.

In the example shown, centrifugal compressor 200 includes seals 252. In some examples, separation plate 211, inlet housing 212, scroll housing 214, and seals 252 may be configured to control flow of vapor refrigerant from second portion 208, through the impeller assembly, to the outlet port. For example, inlet housing 212 may form a distal boundary of the impeller assembly, scroll housing 214 may form a lateral boundary of the impeller assembly, and separation plate 211 may form a proximal boundary of the impeller assembly, and seals 252 may be configured to form a flow path boundary between moving and non-moving components, e.g., the impeller assembly and any of separation plate 211, inlet housing 212, scroll housing 214. In some examples, separation plate 211, inlet housing 212, and/or scroll housing 214, in conjunction with seals 252, may be configured to permit a small amount of flow of vapor refrigerant to flow past various components along shaft 220. For example, various components of compressor 200 that produce heat, such as bearings along shaft 220, may not receive cooling from vapor refrigerant flowing through first portion 204 or second portion 208. To provide cooling to these components, separation plate 211, inlet housing 212, and/or scroll housing 214, and seals 252, may include intake holes 254, e.g., clearances, passages, voids, or other openings or lumens that may provide an additional flow path for small amounts of vapor refrigerant to the various components. In some examples, separation plate 211, inlet housing 212, and/or scroll housing 214, and seals 252, may be configured to flow vapor refrigerant from a higher stage in a multistage impeller, thereby providing a higher pressure vapor refrigerant for cooling the various components than vapor refrigerant from a lower stage. In other examples, separation plate 211, inlet housing 212, and/or scroll housing 214, and seals 252, may be configured to flow vapor refrigerant from a lower stage in a multistage impeller, thereby providing a lower pressure vapor refrigerant (at a corresponding lower power) for cooling the various components than vapor refrigerant from a higher stage.

Figure 3:
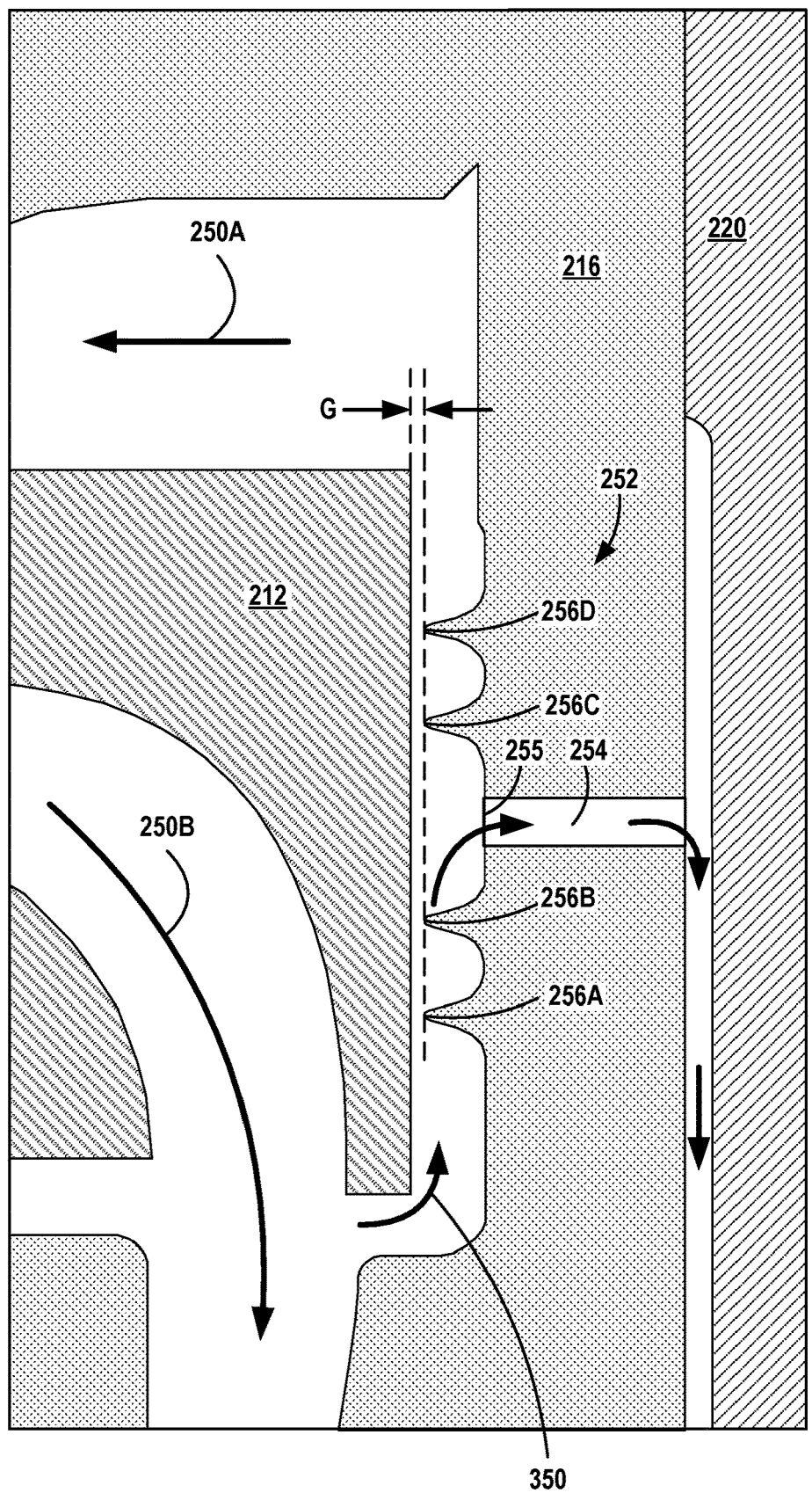
FIG. 3 is a cross-sectional side view diagram illustrating a portion of the example centrifugal compressor of FIG. 2 including an example labyrinth seal, in accordance with one or more techniques of this disclosure.

FIG. 3 is a cross-sectional side view diagram illustrating a portion of the example centrifugal compressor 200 of FIG. 2 including an example labyrinth seal 252, in accordance with one or more techniques of this disclosure. In the example shown, compressor 200 includes inlet housing 212, shaft 220, impeller 216, and seal 252.

In some examples, centrifugal compressor 200 includes a flow path 350 between moving and non-moving parts, e.g., between impeller 216 and inlet housing 212 in the example shown. Flow path 350 may be in fluid communication with flow path 250 between two or more stages, e.g., between flow path portion 250A at a first stage and flow path portion 250B at a second stage having a higher pressure than the first stage. In some examples, centrifugal compressor may include one or more intake holes 254 configured to provide a flow path for fluid, e.g., vapor refrigerant, to cool components of compressor 200, such as bearings (not shown in FIG. 3). For example, there may be a pressure drop from flow path 250B at the second stage and the bearings that draw vapor refrigerate from the second stage though intake holes 254.

In the example shown, seal 252 is configured to reduce a flow of vapor refrigerant from the second, higher pressure stage at flow path 250B to the first, lower pressure stage at flow path 250A through flow path 350, e.g., via at least partially obstructing flow path 350, while still allowing a flow of the fluid to an inlet of intake holes 254. For example, seal 252 may be a labyrinth seal comprising a plurality of teeth 256A-256D. Seal 252 may be a non-contacting labyrinth seal, e.g., such that seal 252 does not contact inlet housing 212. For example, seal 252 may be attached to or integrally formed with impeller 216, and non-contacting with inlet housing 212. In other examples, seal 252 may be attached to or integrally formed with inlet housing 212 and non-contacting with impeller 216. By being non-contacting, seal 252 is configured to have a gap G between vertices of teeth 256A-256D and inlet housing 212 (or impeller 216 in examples in which seal 252 is attached to inlet housing 212). By being non-contacting, seal 252 reduces and/or eliminates debris that would otherwise be generated by contacting inlet housing 212 (or impeller 216), e.g., via friction between seal 252 and the surface it is in contact with. In some examples, seal 252 may be configured to have a gap G which may be greater than about 5 micrometers and less than about 500 micrometers, e.g., G may be about 150 micrometers. In some examples, seal 252 may be made of a compressible material, e.g., a rubber, a silicone, a polymer, or any suitable sealing material. In other examples, seal 252 may be non-compressible. In some examples, seal 252 may comprise a metal, e.g., aluminum, or a thermoplastic.

In the example shown, seal 252 comprises a lumen through its thickness forming, or in fluid communication with, intake holes 254 and comprising a lumen inlet 255 disposed between adjacent teeth of the teeth 256A-256D. In the example shown, seal 252 includes a lumen inlet 255 to a lumen through the thickness of seal 252 that is fluidically coupled with intake hole 254, and lumen inlet 255 and the lumen are positioned between teeth 256B and 256C. In the example shown, intake hole 254 is also positioned between teeth 256B and 256C, but in other examples intake hole 254 may be positioned in any suitable location while fluidically coupled to the lumen through the thickness of seal 252. In other examples, lumen inlet 255 and the lumen may be positioned between any adjacent teeth of 256A-256D, e.g., between teeth 256A and 256B or between teeth 256C and 256D. For example, intake hole 254, lumen inlet 255 and the lumen through the thickness of seal 252 may be positioned in any of the channels between the labyrinth seal 252 teeth 256A-256D.

Positioning inlet 255 and the lumen between adjacent teeth of 256A-256D may be advantageous reducing an amount of vapor refrigerant flowing from the second stage to the first stage outside of flow path 250, e.g., via flow path 350 along impeller 216 and between the first and second stages. In some examples, positioning inlet 255 and the lumen between adjacent teeth of 256A-256D may reduce a pressure drop along flow path 350 from flow path 250B to flow path 250A. For example, positioning inlet 255 and then lumen on the second stage side of seal 252, e.g., on the flow path 250B side of tooth 256A may allow vapor refrigerant to flow into intake hole 254, but may not reduce a pressure drop along flow path 350, whereas locating inlet 255 and the lumen between adjacent teeth of teeth 256A-256D may reduce the pressure drop along flow path 350, e.g., especially from between teeth 256B and 256C to the flow path 250A side of tooth 256D. In some examples, the lumen through the thickness of seal 252 is configured to reduce a fluid pressure between adjacent teeth of teeth 256A-256D via flow of the fluid (e.g., vapor refrigerant) through the intake hole 254. The positioning of inlet 255 and intake hole 254 affects the amount of vapor refrigerant that may flow from the second stage to the first stage via flow path 350. In the example shown, inlet 255 and intake hole 254 is centrally located along a length of seal 252, e.g., the length being in the direction along flow path 350 between impeller 216 and inlet housing 212. In some examples, positioning inlet 255 and the lumen between adjacent teeth of teeth 256A-256D may reduce overall leakage through seal 252, and may compensate for having gap G, e.g., having a non-contacting labyrinth seal.

In one or more examples, the functions described in this disclosure, e.g., with respect to control system 122, controllers 124-128, or any of the systems described herein, may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, PROM, EPROM, EEPROM, FRAM, flash memory, a hard disk, a CD-ROM, a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

Illustrative examples of the disclosure include:

Example 1: A centrifugal compressor including: a first stage and a second stage; a flow path within the centrifugal compressor between the first and second stages; an impeller; and a seal includes a labyrinth seal comprising a plurality of teeth; and a lumen through a thickness of the labyrinth seal having a lumen inlet disposed between adjacent teeth of the plurality of teeth.

Example 2: The centrifugal compressor of example 1, wherein the seal is configured to reduce flow of a fluid outside of the flow path along the impeller and between the first and second stages.

Example 3: The centrifugal compressor of example 1 or example 2, wherein the lumen inlet is centrally located along a length of the seal.

Example 4: The centrifugal compressor of any one of examples 1 through 3, wherein the lumen is configured to reduce a fluid pressure between the adjacent teeth via flow of the fluid through the lumen.

Example 5: The centrifugal compressor of any one of examples 1 through 4, wherein the labyrinth seal comprises a non-contacting labyrinth seal configured to be disposed on the impeller without contacting a stationary portion of the centrifugal compressor.

Example 6: The centrifugal compressor of example 5, wherein the non-contacting labyrinth seal is configured to define a gap between a vertex of each of the plurality of teeth and the stationary portion of the centrifugal compressor, wherein the gap is less than about 500 micrometers and greater than about 5 micrometers.

Example 7: The centrifugal compressor of any one of examples 1 through 6, wherein the centrifugal compressor further comprises a cooling intake hole, wherein the lumen is configured to be fluidically coupled to the cooling intake hole.

Example 8: The centrifugal compressor of example 7, wherein the cooling intake hole is configured to transport fluid to cool a bearing of the centrifugal compressor.

Example 9: The centrifugal compressor of any one of examples 1 through 8, wherein the centrifugal compressor is configured to compress a fluid to a pressure that is higher in the second stage than a pressure of the fluid in the first stage.

Example 10: A vapor-cooling system including: a condenser; an evaporator; and a centrifugal compressor including: an impeller; and a seal including: a labyrinth seal comprising a plurality of teeth; and a lumen through a thickness of the labyrinth seal having a lumen inlet disposed between adjacent teeth of the plurality of teeth.

Example 11: The vapor-cooling system of example 10, wherein the centrifugal compressor comprises: a first stage and a second stage; a flow path within the centrifugal compressor between the first and second stages.

Example 12: The vapor-cooling system of example 11, wherein the seal is configured to reduce flow of a fluid outside of the flow path along the impeller and between the first and second stages.

Example 13: The vapor-cooling system of any one of examples 10 through 12, wherein the lumen inlet is centrally located along a length of the seal.

Example 14: The vapor-cooling system of any of one examples 10 through 13, wherein the lumen is configured to reduce a fluid pressure between the adjacent teeth via flow of the fluid through the lumen.

Example 15: The vapor-cooling system of any one of examples 10 through 14, wherein the labyrinth seal comprises a non-contacting labyrinth seal configured to be disposed on the impeller without contacting a stationary portion of the centrifugal compressor.

Example 16: The vapor-cooling system of example 15, wherein the non-contacting labyrinth seal is configured to define a gap between a vertex of each of the plurality of teeth and the stationary portion of the centrifugal compressor, wherein the gap is less than about 500 micrometers and greater than about 5 micrometers.

Example 17: The vapor-cooling system of any one of examples 10 through 16, wherein the centrifugal compressor further comprises a cooling intake hole, wherein the lumen is configured to be fluidically coupled to the cooling intake hole.

Example 18: The vapor-cooling system of example 17, wherein the cooling intake holes are configured to transport fluid to cool a bearing of the centrifugal compressor.

Example 19: The vapor-cooling system of any one of examples 11 through 18, wherein the centrifugal compressor is configured to compress the fluid to a pressure that is higher in the second stage than a pressure of the fluid in the first stage.

Example 20: A centrifugal compressor including: an impeller; and a seal including: a labyrinth seal comprising a plurality of teeth; and a lumen through a thickness of the labyrinth seal having a lumen inlet disposed between adjacent teeth of the plurality of teeth.

Various examples have been described. These and other examples are within the scope of the following claims.

What is claimed is:

1. A centrifugal compressor comprising:
   a first stage and a second stage;
   a flow path within the centrifugal compressor between the first and second stages;
   an impeller; and
   a seal comprising:
      a labyrinth seal comprising a plurality of teeth; and
      a lumen through a thickness of the labyrinth seal having a lumen inlet disposed between adjacent teeth of the plurality of teeth.

2. The centrifugal compressor of claim 1, wherein the seal is configured to reduce flow of a fluid outside of the flow path along the impeller and between the first and second stages.

3. The centrifugal compressor of claim 1, wherein the lumen inlet is centrally located along a length of the seal.

4. The centrifugal compressor of claim 1, wherein the lumen is configured to reduce a fluid pressure between the adjacent teeth via flow of a fluid through the lumen.

5. The centrifugal compressor of claim 1, wherein the labyrinth seal comprises a non-contacting labyrinth seal configured to be disposed on the impeller without contacting a stationary portion of the centrifugal compressor.

6. The centrifugal compressor of claim 5, wherein the non-contacting labyrinth seal is configured to define a gap between a vertex of each of the plurality of teeth and the stationary portion of the centrifugal compressor, wherein the gap is less than about 500 micrometers and greater than about 5 micrometers.

7. The centrifugal compressor of claim 1, wherein the centrifugal compressor further comprises a cooling intake hole, wherein the lumen is configured to be fluidically coupled to the cooling intake hole.

8. The centrifugal compressor of claim 7, wherein the cooling intake hole is configured to transport fluid to cool a bearing of the centrifugal compressor.

9. The centrifugal compressor of claim 1, wherein the centrifugal compressor is configured to compress a fluid to a pressure that is higher in the second stage than a pressure of the fluid in the first stage.

10. A vapor-cooling system comprising:
a condenser;
an evaporator; and
a centrifugal compressor comprising:
an impeller; and
a seal comprising:
a labyrinth seal comprising a plurality of teeth; and
a lumen through a thickness of the labyrinth seal having a lumen inlet disposed between adjacent teeth of the plurality of teeth.

11. The vapor-cooling system of claim 10, wherein the centrifugal compressor comprises:
a first stage and a second stage; and
a flow path within the centrifugal compressor between the first and second stages.

12. The vapor-cooling system of claim 11, wherein the seal is configured to reduce flow of a fluid outside of the flow path along the impeller and between the first and second stages.

13. The vapor-cooling system of claim 11, wherein the centrifugal compressor is configured to compress a fluid to a pressure that is higher in the second stage than a pressure of the fluid in the first stage.

14. The vapor-cooling system of claim 10, wherein the lumen inlet is centrally located along a length of the seal.

15. The vapor-cooling system of claim 10, wherein the lumen is configured to reduce a fluid pressure between the adjacent teeth via flow of a fluid through the lumen.

16. The vapor-cooling system of claim 10, wherein the labyrinth seal comprises a non-contacting labyrinth seal configured to be disposed on the impeller without contacting a stationary portion of the centrifugal compressor.

17. The vapor-cooling system of claim 16, wherein the non-contacting labyrinth seal is configured to define a gap between a vertex of each of the plurality of teeth and the stationary portion of the centrifugal compressor, wherein the gap is less than about 500 micrometers and greater than about 5 micrometers.

18. The vapor-cooling system of claim 10, wherein the centrifugal compressor further comprises a cooling intake hole, wherein the lumen is configured to be fluidically coupled to the cooling intake hole.

19. The vapor-cooling system of claim 18, wherein the cooling intake hole is configured to transport fluid to cool a bearing of the centrifugal compressor.

20. A centrifugal compressor comprising:
an impeller; and
a seal comprising:
a labyrinth seal comprising a plurality of teeth; and
a lumen through a thickness of the labyrinth seal having a lumen inlet disposed between adjacent teeth of the plurality of teeth.

* * * * *